(12) United States Patent
Lallement et al.

(10) Patent No.: US 12,472,519 B2
(45) Date of Patent: Nov. 18, 2025

(54) PACKAGING DEVICE WITH INTEGRATED VENTILATION SYSTEM

(71) Applicant: HORUS PHARMA, Saint-Laurent-du-Var (FR)

(72) Inventors: Oliver Lallement, St Laurent du Var (FR); Este Renzo, Nice (FR)

(73) Assignee: HORUS PHARMA, Saint-Laurent-du-Var (FR)

( * ) Notice: Subject to any disclaimer, the term of this patent is extended or adjusted under 35 U.S.C. 154(b) by 203 days.

(21) Appl. No.: 18/547,561

(22) PCT Filed: Mar. 4, 2022

(86) PCT No.: PCT/EP2022/055508
§ 371 (c)(1),
(2) Date: Aug. 23, 2023

(87) PCT Pub. No.: WO2022/184883
PCT Pub. Date: Sep. 9, 2022

(65) Prior Publication Data
US 2024/0131543 A1 Apr. 25, 2024
US 2024/0226934 A9 Jul. 11, 2024

(30) Foreign Application Priority Data

Mar. 5, 2021 (FR) ..................................... 2102166

(51) Int. Cl.
*B05B 11/00* (2023.01)
*B65D 51/16* (2006.01)

(52) U.S. Cl.
CPC ...... *B05B 11/0032* (2013.01); *B65D 51/1611* (2013.01)

(58) Field of Classification Search
CPC ........................ B05B 11/0032; B65D 51/1611
See application file for complete search history.

(56) References Cited

U.S. PATENT DOCUMENTS 2,834,496 A * 5/1958 Boston ................... A61J 11/008
215/11.1
4,648,519 A * 3/1987 Kennedy ............ B65D 51/1611
215/261

(Continued)

FOREIGN PATENT DOCUMENTS

WO      9623707 A1   8/1996
WO   2020115399 A1   6/2020

*Primary Examiner* — Timothy L Maust
(74) *Attorney, Agent, or Firm* — BCF LLP (57) ABSTRACT

The present invention relates to a device comprising: —a container (1) intended to contain a product to be dispensed, —a cap (4), —a head mounted on the container and comprising: o a nozzle (31) for discharging the product, and o a collar (2) including: # an upper working portion intended to engage with the cap to close the distribution device, and # a lower combining portion intended to engage with the container, characterised in that the device further comprises at least one ventilation opening which opens onto the interface between the upper working portion and the lower combining portion so as to maintain an air communication channel between the outside and inside of the packaging device when the cap is mounted on the collar.

8 Claims, 7 Drawing Sheets (56) References Cited

U.S. PATENT DOCUMENTS

| | | | |
|---|---|---|---|
| 5,803,281 A * | 9/1998 | Towns | B65D 41/3447 |
| | | | 215/44 |
| 6,202,717 B1 * | 3/2001 | Markey | B67D 7/0294 |
| | | | 251/149.6 |
| 6,938,800 B1 | 9/2005 | Lehmkuhl | |
| 7,461,754 B2 * | 12/2008 | Walsh | B65D 53/04 |
| | | | 215/261 |
| 2016/0046413 A1 | 2/2016 | Hamdoun | |
| 2016/0244222 A1 | 8/2016 | Sterling et al. | |

\* cited by examiner

PACKAGING DEVICE WITH INTEGRATED VENTILATION SYSTEM

CROSS-REFERENCE TO RELATED APPLICATIONS

This application is a National Phase Entry of international PCT patent application No. PCT/EP2022/055508 filed on Mar. 4, 2022, and which claimed the benefit of priority of French application no. FR 2102166 filed on Mar. 5, 2021. The contents of the above noted application are incorporated herein by reference.

FIELD OF THE INVENTION

The present invention relates to the general technical field of packing, and specifically the field of packaging and dispensing of a liquid, semi-fluid or viscous product dispensed in portions or in doses.

The object of the invention is more particularly a device for packaging and dispensing a product, of the type comprising:
- a container containing the product,
- a head configured to be positioned on an open neck of the container, and
- a cover adapted to cover the head of the packaging device.

The product intended to be packaged and dispensed may be a cosmetic product, or a hygiene product, or a face and/or body care product, or a make-up product, or a sunscreen product, or a pharmaceutical product (for example an ophthalmic solution), or a food product.

BACKGROUND OF THE INVENTION

Packaging devices are known which make it possible to preserve and dispense a product in the form of doses or drops or in any other form, while maintaining its cleanliness throughout the duration of its use. These devices are used in particular in the pharmaceutical, cosmetic and food industries.

Such a device conventionally comprises:
- a container intended to receive the product with a liquid, viscous or pasty consistency,
- a dispensing head whose actuation allows the ejection of a dose of product at the level of a tip of the dispensing head, and
- a cap able to be screwed or clipped onto the dispensing head to close the packaging device.

The principle of using such a device is as follows. When the user wishes to obtain a dose, he removes the cover and actuates the dispensing head which ejects a dose of product. Then, the user closes the device by repositioning the cap on the dispensing head.

After delivery of a dose, there is generally a residual amount of product left on the tip of the dispensing head.

When the cap is replaced on the pump, this residual amount of product is found trapped in a closed volume defined between the cap and the dispensing head. This prevents the product from drying out, and creates a humid environment conducive to bacterial growth, particularly if the product is a preservative-free solution with a high percentage of water.

It is therefore advantageous to dry this residual amount of product in order to limit the risks of bacterial growth.

Ventilation systems have already been proposed. Such systems consist of through orifices formed in an upper wall of the cap. These through orifices make it possible to open the closed volume in order to facilitate the drying of the residual amount of product.

However, a disadvantage of these existing ventilation systems is that dust or other contaminants present in the ambient air can fall on the dispensing head by gravity by crossing the cap at the level of the through orifices.

One aim of the present invention is to propose a ventilation system making it possible to overcome the aforementioned drawback. Particularly, one aim of the present invention is to propose a device for packaging a product—such as a cream or a gel or a liquid-integrating a ventilation system arranged to limit the risks of dust fallout on a dispensing head of the packaging device.

BRIEF DESCRIPTION OF THE INVENTION

To this end, the invention proposes a device for packaging a product to be dispensed, the device comprising:
- a container intended to contain the product to be dispensed,
- a cap,
- a head mounted on the container and including:
  - a product outlet nozzle, and
  - a collar including:
    - an upper working part intended to cooperate with the cap for closing the dispensing device, and
    - a lower combining part intended to cooperate with the container, remarkable in that the device further comprises at least one ventilation aperture opening out at the interface between the upper working part and the lower combining part to maintain an air communication channel between the inside and the outside of the packaging device when the cap is mounted on the collar.

Preferred but non-limiting aspects of the packaging device are as follows:
- the upper working part can be composed of:
  - a first cylindrical side wall,
  - an annular cup protruding radially inwardly from an upper edge of the first side wall, and
  - a shoulder protruding radially outwardly from a lower edge of the first side wall, each through aperture consisting of a groove disposed between the annular cup and the lower combining part,
- the upper working part can be composed of:
  - a first cylindrical side wall,
  - an annular cup protruding radially inwardly from an upper edge of the first side wall,
  - a shoulder protruding radially outwardly from a lower edge of the first side wall, and
  - an annular flange extending radially outwardly, said annular flange being in contact with the shoulder and being intended to cooperate with a side wall of the cap so as to maintain the cap at a non-zero distance from the first side wall, each through aperture comprising a recess disposed in the shoulder and the annular flange, said recess extending between the lower combining part and the first side wall;
- the packaging device can also comprise a tear-off tamper-evident band connecting the cap to the collar as far as the first aperture, the tamper-evident band being arranged so as to cover each ventilation aperture before the first use of the packaging device;
- the packaging device can also comprise a filter associated with each ventilation aperture;

the packaging device can further comprise means for adjusting the ventilation level, the actuation of said adjusting means making it possible to vary the size of each ventilation aperture;

the first cylindrical side wall can comprise at least one through lumen, each through lumen being in fluid communication with a respective ventilation aperture when the cap is mounted on the collar;

the packaging device can comprise three ventilation apertures distributed radially every 120 degrees;

the cap can include at least one through hole.

BRIEF DESCRIPTION OF THE DRAWINGS

Other advantages and characteristics of the packaging device will emerge better from the following description of several variants of embodiments, given by way of non-limiting examples, from the appended drawings in which.

DETAILED DESCRIPTION OF THE INVENTION

One example of a packaging device according to the invention will now be described in more detail with reference to the figures. In these various figures, the equivalent elements are designated by the same reference numeral.

1. Generalities 1.1. Presentation of the Packaging Device

Figure 1:
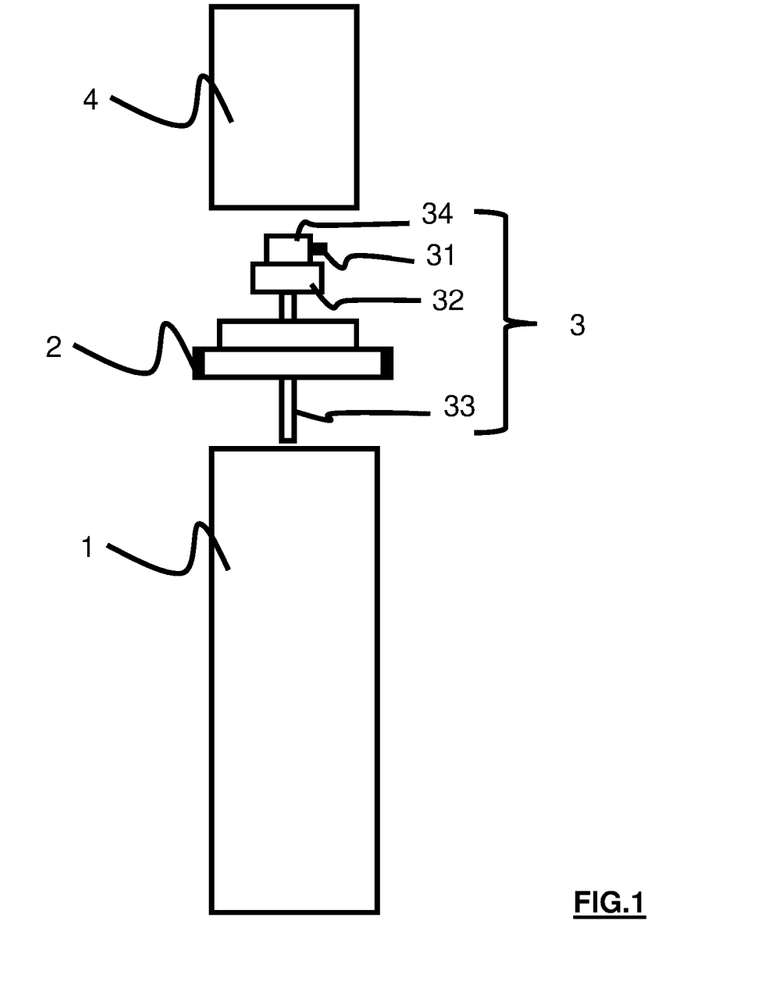
FIG. 1 is a schematic representation of a packaging device.

Referring to FIG. 1, the packaging device comprises:
a container 1 provided to contain the product to be dispensed,
a collar 2 on top of the container 1,
a pump 3 intended to be associated with the collar 2 at the level of an aperture of the collar 2,
a cap 4 intended to cover the collar 2 for the storage or the transport of the packaging device.

The product can be liquid, viscous or pasty. It can be in particular a cosmetic product, a food product or a drug.

As indicated above, when using such a packaging device, a residual amount of product may remain at the level of a nozzle 31 of the pump 3.

To allow the drying of this residual amount of product, the packaging device according to the invention integrates a ventilation system which will be described in more detail below.

This ventilation system comprises one (or more) ventilation aperture(s) made in the collar 2, at the level of an area in which the cap 4 is fixed on the collar 2. These ventilation apertures allow the circulation of air between the cap 4 and the collar 2, in order to facilitate the drying of the residual amount of product which may be at the level of the nozzle 31 after use of the packaging device.

1.2. Advantages of the Packaging Device

The solution proposed in the present invention has many advantages, in particular with respect to existing systems based on the formation of through orifices in the upper wall of the cap.

In particular, it makes it possible to protect the pump 3 from dust or other contaminants present in the ambient air since these cannot fall on the pump 3 by gravity.

The solution according to the invention further makes it possible to facilitate the discharge of the residual amount of product in the event that the latter would detach from the nozzle 31. If the solution is liquid enough, and the residual amount of product flows downwards, the aperture(s) allow(s) its discharge to the outside of the packaging device (rather than its accumulation around the base of the pump 3).

Furthermore, the proposed solution makes it possible to limit the costs associated with the manufacture of the packaging device, since it is industrially simpler to modify the shape of the collar 2 in order to provide the aperture(s) therein, than to make through orifices on the upper wall of the cap 4. Indeed, the modification of the shape of the collar 2 can be obtained by modifying the shape of the injection mold of the collar 2, while making the through orifices in the upper wall of the cap 4 requires the implementation of an additional drilling (or deburring) step of the cap 4 subsequently to its molding. Furthermore, if the shape of the through orifices is directly provided at the level of the cap 4 manufacturing mold, this can disturb the plastic injection during the manufacture and the regular flow of the dyes, which is a critical point in the field of cosmetics where colors and appearance are paramount.

In addition, the positioning of the ventilation aperture(s) at the lateral periphery of the packaging device makes it possible to limit the risks of obturation of the ventilation system relative to an orifice made on the upper surface of the cap 4, in particular in the case of stacking of objects on the packaging device, etc.

Figure 4:
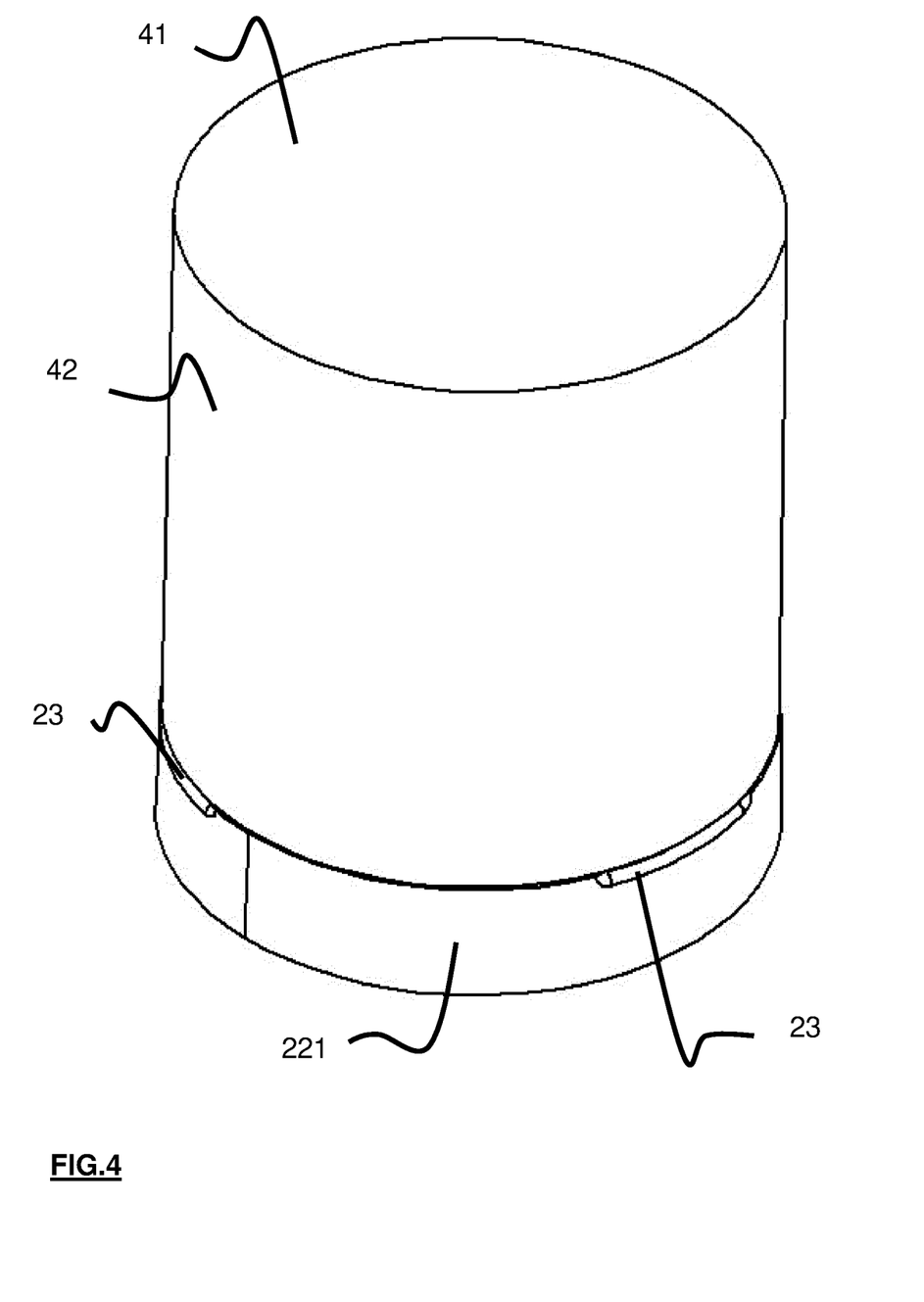
FIG. 4 is a schematic representation in perspective of a cap of the packaging device when the latter covers the collar.
Figure 5:
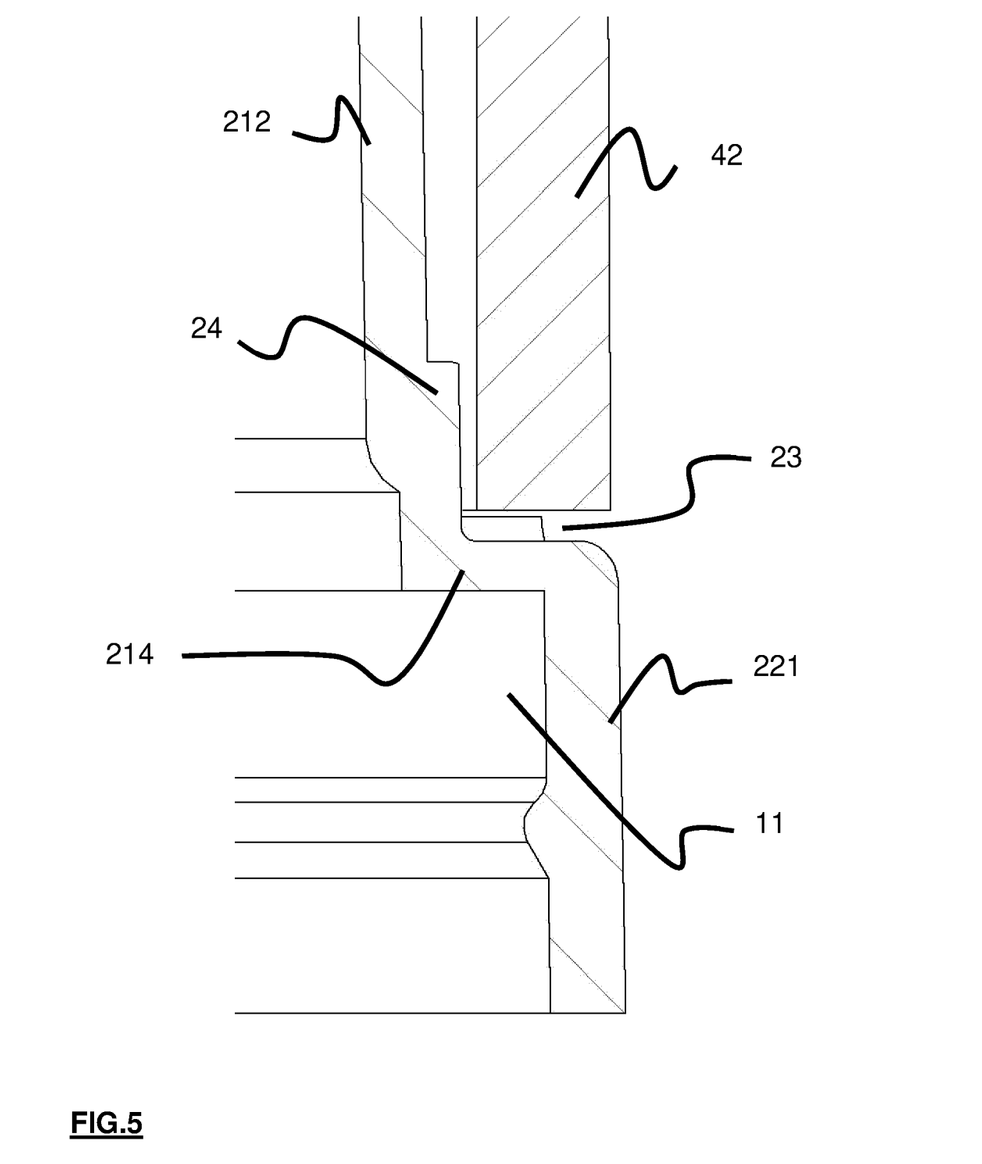
FIG. 5 is a partial sectional view of the collar and of the cap when the collar is closed by the cap.

Finally, the proposed solution has improved aesthetics since when the cap 4 is mounted on the collar 2, the aperture(s) is (are) largely hidden, as illustrated in FIG. 4.

The various elements constituting the packaging device will now be described in more detail.

2. Container

The container 1 is configured to contain the product to be packaged and dispensed. The container 1 can be made of different materials known to those skilled in the art (glass, polypropylene, etc.) depending on the intended application.

In some embodiments, the container 1 is transparent or translucent, for example when the product consists of an alcoholic perfume solution. In other embodiments, the container 1 is opaque, for example when the product consists of an ophthalmic liquid which must be protected from light.

The container 1 can be of any shape known to those skilled in the art (cylindrical, cubic shape, etc.). It comprises:
a bottom,
one (or more) side wall(s), and
an upper aperture.

The free end(s) of the side wall(s) opposite to the bottom define(s) a neck 11 on which the collar 2 is mounted.

Such a container 1 being known to those skilled in the art, it will not be described in more detail below.

3. Cap

The cap 4 makes it possible to close the packaging device. More specifically, the cap 4 makes it possible to cover the collar 2 and the pump 3 of the packaging device in order to protect the pump 3 and avoid the risks of accidental ejection of product during the transport and/or storage of the packaging device.

The cap 4 can be made of plastic material or any other material known to those skilled in the art. It comprises:
- an upper wall 41, and
- a side wall 42 (or several, depending on the shape of the cap).

The side wall 42 can comprise an annular groove on its inner face, in the vicinity of its free end opposite to the upper wall 41. This annular groove is intended to cooperate by clipping, with a corresponding annular bead 215 disposed in the collar 2. As a variant, the side wall 42 can comprise a thread on its inner face, in the vicinity of its free end opposite to the upper wall. In this case, the thread of the cap 4 is intended to cooperate by screwing, with a corresponding thread disposed in the collar 2.

The bead/thread makes it possible to removably fix the cap 4 on the collar 2 when closing the packaging device.

Such a cap 4 being known to those skilled in the art, it will not be described in more detail below.

4. Pump

The pump 3 makes it possible to eject the product contained in the container to the outside.

The pump 3 comprises a pump body 32 on which a dip tube 33 is mounted in the lower part. The dip tube 33 is intended to be immersed in the product to allow said pump 3 to be supplied with the product to be dispensed.

The pump 3 incorporates functional members (not represented) which allow, by actuation of a push button 34, to dispense the solution via the nozzle 31.

A large number of arrangements and kinematics of pumps which allow the dispensing of product, on which the invention can be implemented, are known. This is why the reader will appreciate that the packaging device according to the invention is not limited to the pump 3 described above, and that the packaging device can comprise another type of pump.

Figure 7:
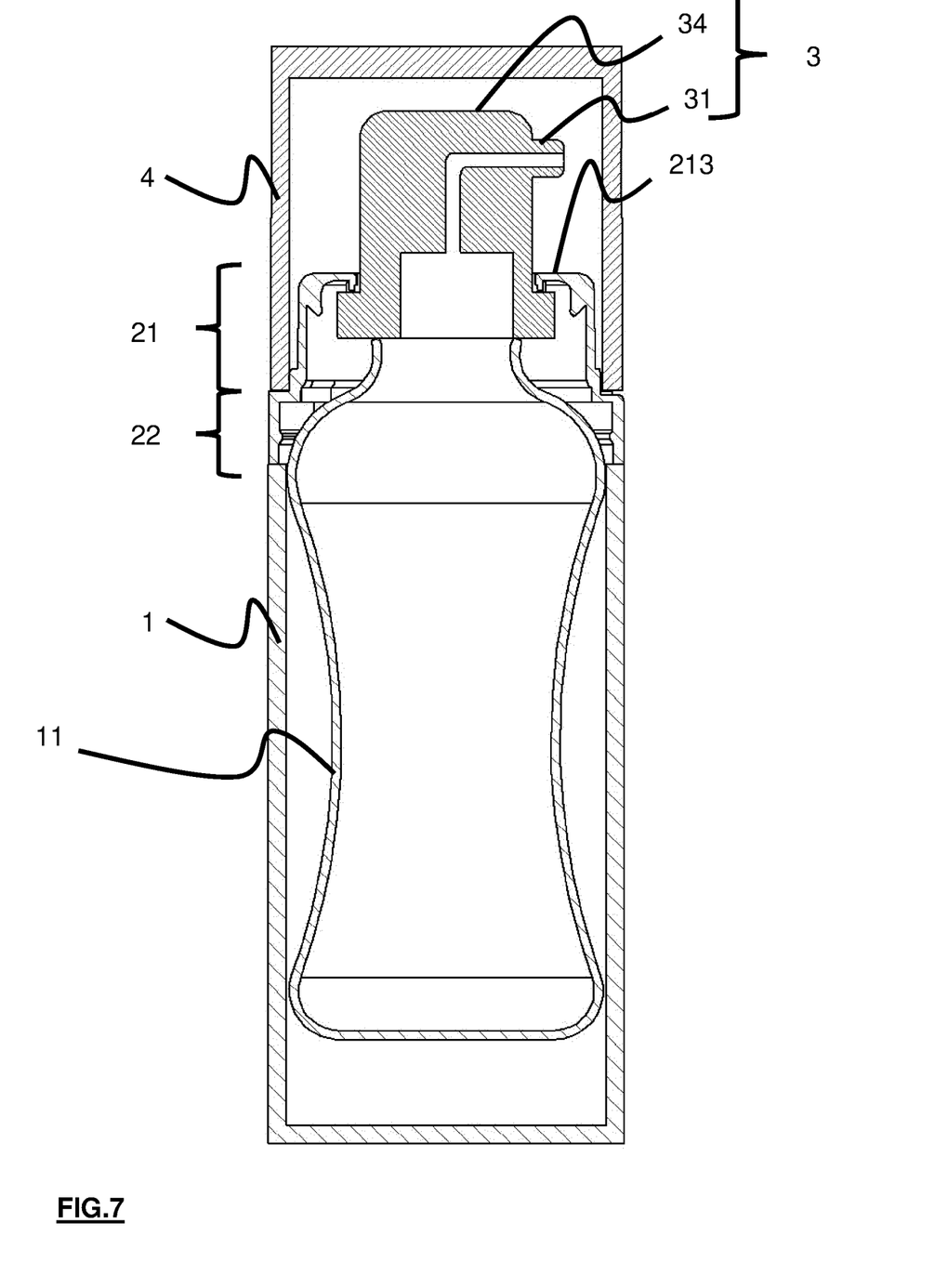
FIG. 7 is a schematic representation of one variant of embodiment of the packaging device.

For example, in one embodiment, the pump may be devoid of dip tube. One example of such an embodiment is illustrated in FIG. 7. In this embodiment, the device includes a flexible pouch 11 containing the product to be dispensed. This flexible pouch 11 is housed in the container 1. The flexible pouch 11 is configured to contract as the amount of product it contains decreases. This makes it possible to guarantee that the product contained in the flexible pouch 11 is "pushed" towards the pump 3, with no air gap between the product and the pump 3. This configuration of the container 1 (known under the name "pouch-bottle") eliminates the need for a dip tube.

5. Collar

5.1. Presentation

The collar 2 is intended to be mounted on the container 1. It constitutes an interfacing element making it possible to assemble the pump 3 on the container 1.

In some embodiments, the collar 2 may be integral with the container 1.

In other embodiments, the collar 2 and the pump 3 are in one-piece.

Finally, in other embodiments, the collar 2, the container 1 and/or the pump 3 are separate components intended to be assembled during the manufacture of the packaging device. In this case, the collar 2 is configured to be fixed on the neck of the container 1, for example:
- by screwing onto a thread provided on the container 1, or
- by interlocking.

In the following, the collar 2 will be described with reference to a packaging device in which the collar 2, the pump 3 and the container 1 are three distinct components intended to be assembled together during the manufacture of the packaging device.

Figure 2:
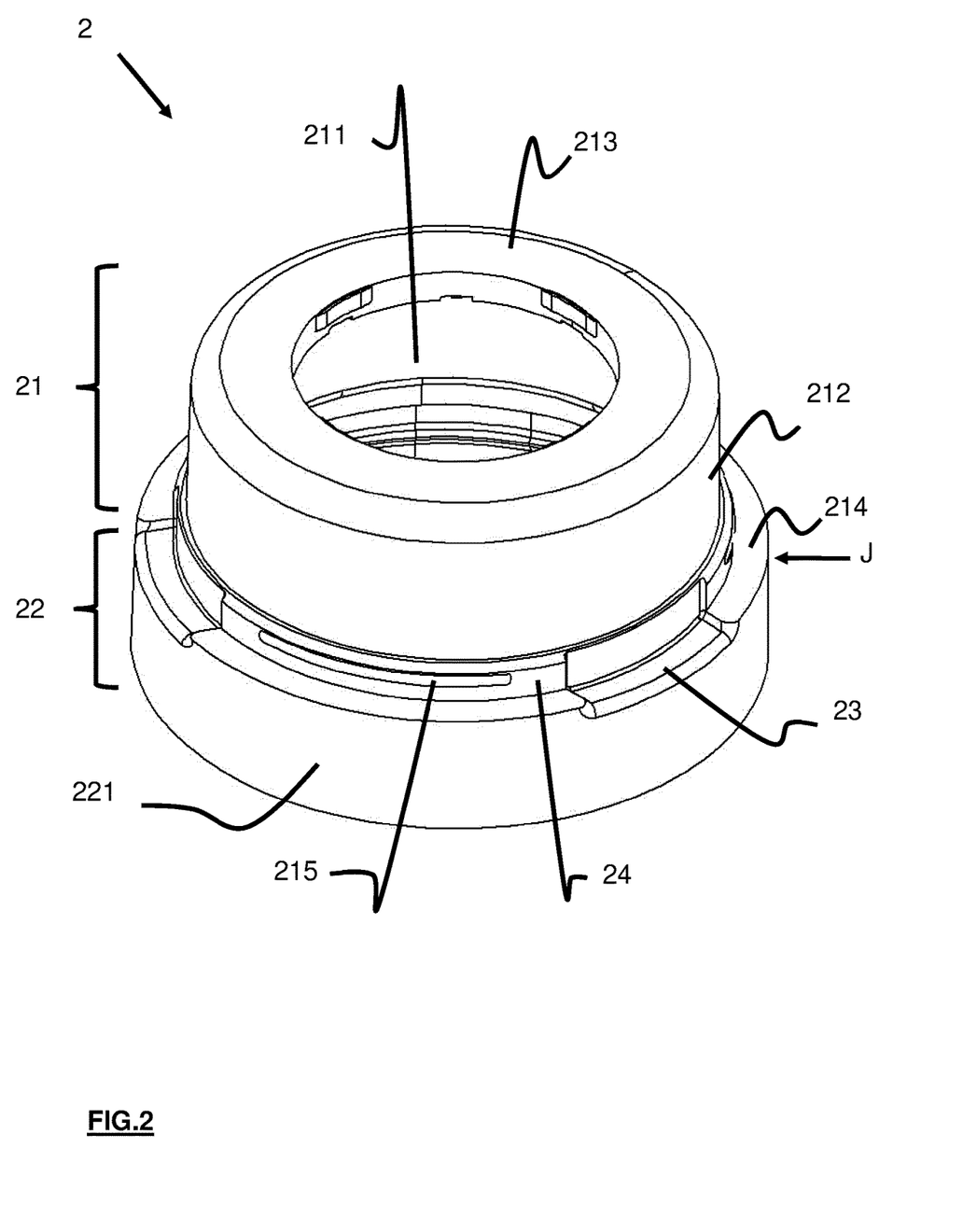
FIG. 2 is a schematic representation in perspective of a collar of the packaging device.

Referring to FIG. 2, the collar 2 includes an upper working part 21 and a lower combining part 22 having two successive diameters:
- the upper working part 21 defines a central passage 211 at which the pump 3 is mounted; this upper part 21 is located inside the cap 4 when the latter covers the packaging device,
- the lower combining part 22 allows the connection (by screwing or interlocking) of the collar 2 on the container 1.

More specifically, the upper working part 21 is composed of a first cylindrical side wall 212, and of an annular cup 213 protruding radially inwardly from the upper edge of the first side wall 212. This first side wall 212 is continued by a shoulder 214, protruding radially, which is extended by a second cylindrical side wall 221 forming the lower combining part 22.

Advantageously, the collar 2 comprises a ventilation aperture 23 opening out at the interface J between the upper working part 21 and the lower combining part 22.

This ventilation aperture 23 makes it possible to maintain a communication channel between the inside and the outside of the packaging device when the cap 4 is mounted on the collar 2. This makes it possible to maintain air circulation in the volume defined between the cap 4, the collar 2 and the pump 3 when the cap 4 is fixed on the collar 2. The drying of any residual amount of product (remaining on the nozzle of the pump after use of the packaging device) is thus facilitated.

The packaging device can comprise a single aperture 23, or a plurality of apertures 23 distributed over its periphery. For example, in the embodiment illustrated in FIG. 2, the packaging device comprises three ventilation apertures 23 distributed every 120° and opening out at the level of the junction area J between the cap 4 and the collar 2.

5.2. Variants of Ventilation Apertures

In one embodiment not represented, each ventilation aperture 23 comprises a groove disposed in the shoulder 214 and the first side wall 212. Thus, when the cap 4 is positioned on the collar 2, this groove constitutes, with the inner face of the cap 4, an air circulation channel between the outside of the device and the interior volume between the collar 2, the pump 3 and the cap 4.

In another embodiment, each ventilation aperture is defined by:
- an annular flange 24 protruding radially outwardly at the level of the interface J between the upper working part 21 and the lower combining part 22, a recess disposed in the shoulder 214 and the annular flange 24.

Figure 3:
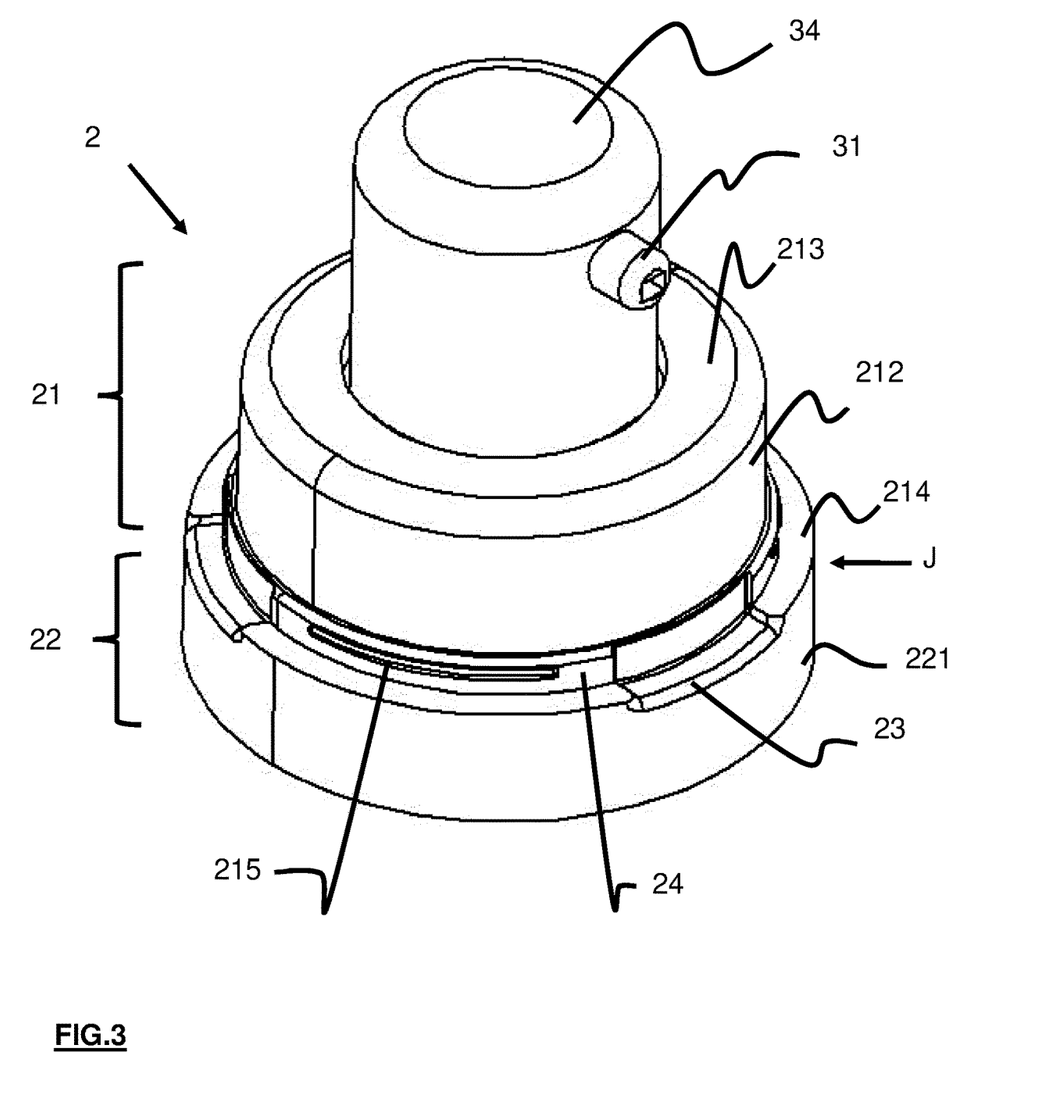
FIG. 3 is a schematic representation in perspective of the collar and of a pump of the packaging device.

More specifically and with reference to FIGS. 2 and 3, the upper working part 21 comprises an annular flange 24 at the level of the end of the first side wall 212 opposite to the cup 213 (i.e. at the level of the end connected to the shoulder). This annular flange 24 protruding radially outwardly of the first side wall 212. The collar 24 makes it possible to maintain the side wall 42 of the cap 4 at a non-zero distance from the first side wall 212 when the cap 4 is mounted on the collar 2. There is then a cylindrical space between:

the outer face of the first side wall 212, and
the inner face of the side wall 42 of the cap 4.

The recess is for its part made in the shoulder 214 and the annular flange 24. It makes it possible to establish an air communication duct between the cylindrical space and the outside of the packaging device when the cap 4 is fixed on the collar 2 (i.e. closed packaging device).

6. Optional Aspects

6.1. Tamper-Evident Band

The device can comprise a tear-off tamper-evident band (not represented) connecting the cap 4 to the collar 2 as far as the first aperture. In this case, the tamper-evident band can be arranged so as to cover the ventilation aperture(s) 23.

Thus, during the storage of the packaging device prior to its first use, the ventilation apertures 23 are closed, and the interior volume defined between the cap 4, the collar 2 and the pump 3 remains airtight, which limits the losses by evaporation and the contamination risks.

After the first use (i.e. once the band has been torn off), the ventilation aperture(s) 23 is (are) open, and the internal volume of the cap 4 is well ventilated.

The tamper-evident band may consist of a tear-off plastic film or any other type of tamper-evident band known to those skilled in the art.

6.2. Filter

Advantageously, each ventilation aperture can be equipped with a filter or a valve, for example allowing air and humidity to pass but blocking the passage of bacteria or liquids coming from outside.

Such a filter can for example consist of a band of porous fabric welded to the cap, or injected with the cap 4 during the molding of the latter.

6.3. Means for Adjusting the Ventilation Level

In one embodiment, the packaging device can comprise means for adjusting the ventilation level of the volume defined between the cap 4, the pump 3 and the collar 2.

In the case where the cap cooperates by clipping with the collar 2, the means for adjusting the ventilation level may consist of two adjacent slots disposed on the inner face of the cap 4, in the vicinity of its free end opposite to the upper wall 41. When the lower groove (i.e. groove closest to the free end of the side wall of the cap) cooperates with the annular bead 215 provided in the collar 2, the ventilation aperture(s) 23 is (are) fully open. When the upper groove (i.e. groove furthest from the aperture of the cap) cooperates with the annular bead 215, the ventilation aperture(s) 23 is (are) totally or partially closed.

In the case where the cap 4 cooperates by screwing with the collar 2, the means for adjusting the ventilation level can consist of an indexation at two screwing levels.

6.4. Additional Through Lumens

For some applications, it may be advantageous to combine the ventilation aperture(s) 23 with one (or several) through lumen(s) made in the first side wall 212.

Figure 6:
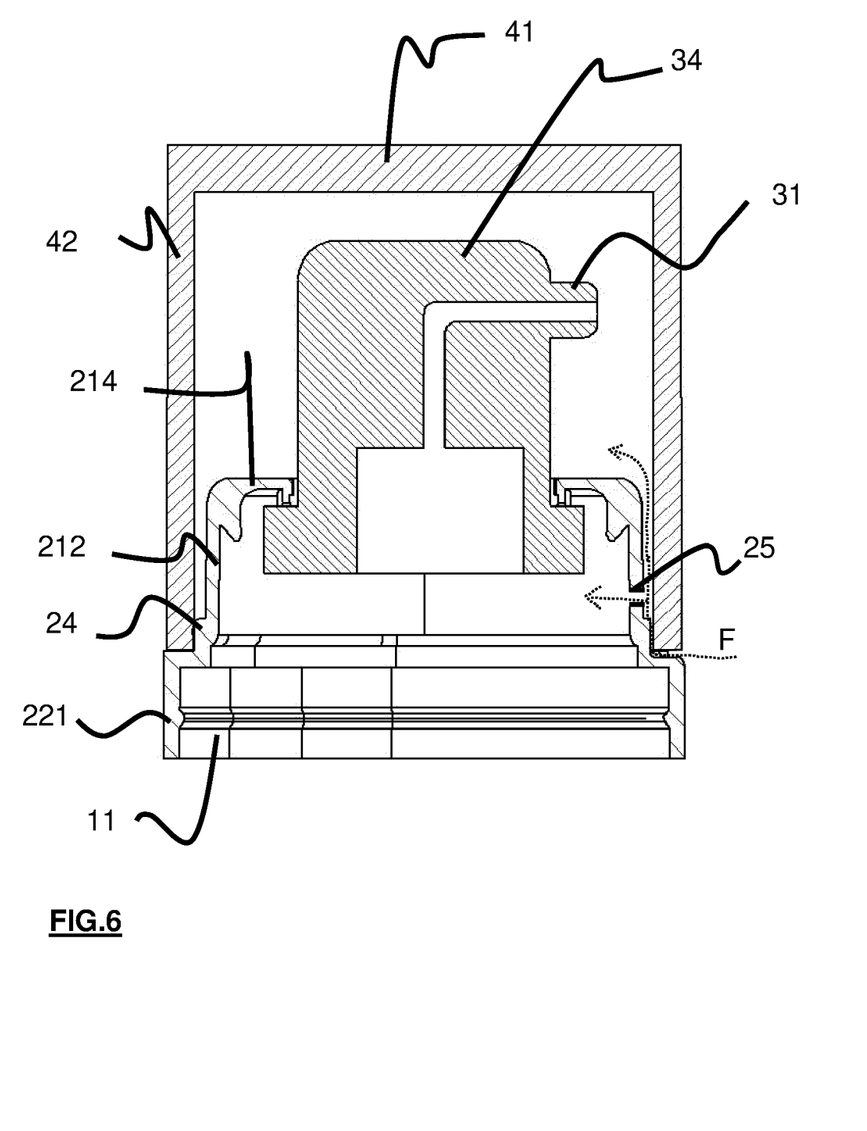
FIG. 6 is a sectional view of the cap, of the collar and of the pump

Indeed, as illustrated in FIG. 6, the push button 34 is dissociated from the collar 2 at the level of the annular cup 213. During the extraction of a dose of product by the user, a certain portion of product may infiltrate (by gravity) between the push button 34 and the annular cup 213. In this case, this portion of product is trapped under the annular cup 213.

The formation of one (or more) through lumen(s) 25 (each) coinciding with the ventilation aperture (or a respective aperture) 23 allows circulation of air F under the cup 213 in order to dry any portion of product trapped thereunder.

7. Operating Principle

The operating principle of the packaging device described above is as follows.

The user wishing to receive a dose of product removes the cap 4 from the packaging device, either by unscrewing or by unclipping the cap from the collar 2. The solution of fixing by screwing the cap 4 makes it possible to limit the risks of obturation of the aperture(s). Indeed, the scanning movement created during the screwing/unscrewing of the cap 4 contributes to wiping the ventilation apertures 23 and to preventing them from clogging.

Then, the user actuates the push button 34 to activate the pump 3. A portion of product is sucked from the container 1 thanks to the dip tube 33 and to the functional members of the pump 3. This portion of product is ejected at the level of the outlet nozzle 31. A residual amount of product remains at the level of the outlet nozzle 31.

Once the dose has been recovered, the user repositions the cap 4 on the collar 2 to close the packaging device. Thanks to:

the ventilation aperture(s) 23 disposed in the collar 2, and
the annular flange 24 making it possible to maintain the side wall 42 at a non-zero distance from the first side wall 212,
an air stream F is generated in the volume defined between the collar 2 and the cap 4, which tends to promote the drying of the residual amount of product remaining on the outlet nozzle 31.

The risks of deposition of dust (or any other type of particles in suspension in the air) on the nozzle 31 are limited due to the lateral positioning of the ventilation aperture(s) 23. In the assumption that the residual amount of product would detach from the nozzle 31, the latter could be discharged to the outside of the packaging device via the ventilation aperture(s).

The reader will have understood that many modifications can be made to the invention described above without materially departing from the new teachings and advantages described here.

For example, the device may be devoid of a pump. For example, the device can comprise a tip, of the type without air inlet, integrated into the collar. In this case, the dispensing of the product is obtained by pressure exerted by the user on the walls of the container. Such a tip is for example described in document U.S. Pat. No. 5,605,257. It comprises a flexible part in cooperation with a rigid part such that the elastic end of said flexible part deviates from the end of said rigid part when a pressure is exerted on the container, thus allowing a portion of product to be expelled, and returns to its initial position under the effect of its elasticity without allowing outside air to penetrate inside the container.

This is why in the attached claims, reference is made to an "ejection head" in order to cover the different solutions that can be chosen for the ejection of the product (pump, tip of the type without air inlet, etc.).

Furthermore, even if the annular flange illustrated in FIG. 2 is continuous over the entire circumference of the collar, it is understood for those skilled in the art that this collar can be discontinuous (for example composed of disjoint coils in an arc of a circle positioned over the entire circumference of the collar).

Also, the reader will have understood that the ventilation apertures described above can be combined with one (or more) through hole(s) made in the upper wall of the cap and/or in the side wall of the cap. This allows air circulation (entrance from below, exit from above) which promotes the drying of the residual amount of product remaining at the level of the ejection head.

The invention claimed is:

1. A device for packaging a product to be dispensed, the device comprising:
   a container configured to contain the product to be dispensed,
   a cap,
   a head mounted on the container and including:
      a product outlet nozzle, and
      a collar including:
         an upper working part configured to cooperate with the cap for closing the device, and
         a lower combining part configured to cooperate with the container,
   at least one ventilation through aperture opening out at the interface between the upper working part and the lower combining part, said at least one ventilation through aperture maintaining an air communication channel between the inside and the outside of the packaging device when the cap is mounted onto the collar,
   wherein the upper working part is composed of:
      a first cylindrical side wall,
      an annular cup which protrudes radially inwardly from an upper edge of the first side wall, and
      a shoulder which protrudes radially outwardly from a lower edge of the first side wall, and
   wherein said at least one ventilation through aperture consists of a groove disposed between the annular cup and the lower combining part.

2. The packaging device according to claim 1, wherein the upper working part is composed of:
   a first cylindrical side wall,
   an annular cup which protrudes radially inwardly from an upper edge of the first side wall,
   a shoulder which protrudes radially outwardly from a lower edge of the first side wall, and
   an annular flange which protrudes radially outwardly, wherein said annular flange is in contact with the shoulder and is configured to cooperate with a side wall of the cap so as to maintain the cap at a non-zero distance from the first side wall, and
   wherein said at least one ventilation through aperture comprises a recess disposed in the shoulder and the annular flange, wherein said recess extends between the lower combining part and the first side wall.

3. The packaging device according to claim 1, further comprising a tear-off tamper-evident band connecting the cap to the collar as far as the first aperture, wherein the tamper-evident covers said at least one ventilation through aperture before the first use of the packaging device.

4. The packaging device according to claim 1, further comprising a filter associated with said at least one ventilation through aperture.

5. The packaging device according to claim 1, further comprising adjusting means for adjusting the ventilation level, wherein the actuation of said adjusting means are configured to vary the size of said at least one ventilation through aperture.

6. The packaging device according to claim 1, wherein the first cylindrical side wall comprises at least one through lumen, wherein said at least one through lumen is in fluid communication with a respective ventilation aperture when the cap is mounted onto the collar.

7. The packaging device according to claim 1, comprising three ventilation through apertures distributed radially every 120 degrees.

8. The packaging device according to claim 1, wherein the cap has at least one through hole.

* * * * *